United States Patent [19]

Dolch

[11] 3,842,200

[45] Oct. 15, 1974

[54] CONTRAST PROCESSING OF VIDEO SIGNALS WITH SELF-ADJUSTING REFERENCE

[75] Inventor: Volker Dolch, Neu Isenburg, Germany

[73] Assignee: Scanner, Inc., Houston, Tex.

[22] Filed: Oct. 19, 1972

[21] Appl. No.: 299,060

[52] U.S. Cl. .................................. 178/7.1, 307/268

[51] Int. Cl. ............................................ H04n 1/00

[58] Field of Search ........ 178/7.1, DIG. 26, 7.5 DC, 178/7.2, DIG. 3; 235/61.11 F, 61.11 A, 61.11 R; 307/264, 268, 237

[56] References Cited

UNITED STATES PATENTS 3,303,330 2/1967 Klein ........................... 235/61.11 F 3,500,073 3/1970 Salaman.............................. 178/7.1

*Primary Examiner*—Richard Murray
*Assistant Examiner*—R. John Godfrey
*Attorney, Agent, or Firm*—Smyth, Roston & Pavitt

[57] ABSTRACT

A circuit for converting a video signal into a train of pulses, using floating black or white reference level which is established through a sample-and-drift circuit. The latter circuit provides a signal which is updated on each video signal excursions, but drifts towards levels in the opposite directions. The reference signal is shifted additionally relative to the video signal to obtain trigger levels between peak-to-valley excursions in the video signal representing a scanning pass across contrasting markers.

9 Claims, 8 Drawing Figures

CONTRAST PROCESSING OF VIDEO SIGNALS WITH SELF-ADJUSTING REFERENCE

BACKGROUND OF THE INVENTION

The present invention relates to a method and system for processing video signals, i.e., for processing electrical signals which have resulted from an electro optical pick up operation. Such optical pick up is, for example, employed in case of reading contrasting information contained in a two-dimensional data field and which is scanned in a particular line scan process.

By way of example, the information to be ascertained may have digital significance and is represented by particularly contrasting markers arranged in a particular pattern. The scanning process may for some reason or another not be restricted to the data field area, but may cover the environment of the field to a smaller or larger extent. The data read process may concur or may have been preceded by a locating operation which search for and detected location and position, etc., of a data field within a particular area. Apparatus of this type is disclosed, for example, in U.S. Pat. Nos. 3,600,556 and 3,684,867 or copending applications Ser. No. 278,468 filed Aug. 7, 1972 now Pat. No. 3,801,775, and Ser. No. 284,733 filed June 29, 1972. The present invention refers specifically to processing the read or video signals produced during the data read process proper, taking into account that the resulting signal cannot be deemed to include information only.

A typical problem arises, for example, if the data field itself is not completely clean or if the data markings are endowed with some imperfection or the like. In other words, not all observed contrasts resulting, for example, in a drop in the video signal level can be deemed safely to include valid contrast information. In the most simple form, of course, the circuit processing the video signal as it results during a data read scan could be processed by regarding signals above a particular level as representing white or bright; signals below a particular level are deemed as black or dark. This way, i.e., through a simple threshold circuit, it is, of course, possible to convert the information into a train of pulses. Basically, this kind of operation is possible if the contrasting information is in fact sufficiently dark and if the background is really white and if the markings are sufficiently large when compared with the dimensions of the scanning spot. Also, this simple method would work if the label can be expected to be substantially free from contrasting markings other than the desired data markings. In reality, none of these conditions are met.

Some information markings may be printed in rather light "black"; the labels or other background may be dirty. Moreover, the markings may not always be large; the scaning process may cover a large area so that inherently the markings have small dimensions in the scanning field covered; particularly the dimensions in direction of scanning may be quite comparable to the effective diameter of the scanning spot. In other words, the data read scanning process must be designed on the assumption of high resolution. This latter problem relates primarily to limitations in focusing the scanning spot. Another problem results from the fact that for higher scanning speed variations in frequency response produce loss in signal level difference (peak to valley excursion) for closely spaced dark markers as compared with widely spaced ones and/or broader markings.

DESCRIPTION OF THE INVENTION

It is an object of the present invention to provide for particular processing of video signals gained under such circumstances and under conditions as outlined above. It is, therefore, a particular object of the present invention to provide processing of video signals which can be regarded as a digitizing or quantizing process and which is coupled with a rejection process for suppressing unwanted contrasts.

In accordance with the preferred embodiment of the present invention, it is suggested to quantize video information by extracting a particular reference signal from the video signal itself. One can describe this process as establishing a floating black or white reference level. Signal minima or maxima are sampled, but the sampled amplitude is not held constant; rather, a controlled drift is permitted, the rate of which, however, is significantly slower than the rate of signal changes as they occur when the scanning spot passes across contrast markings of specific interest. The thus sampled and drifting signal is updated with each excursion, and the rate of drift is selected so that the next updating is with a very high degree of probability the result of a passage of the scanning spot across a data marking. Moreover, this reference signal is updated even if the next excursion is higher or lower than the previous one. The reference signal is compared with the video signal proper, preferably in combination with a signal that establishes and defines a trigger and threshold of constant or controlled-variable amplitude.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
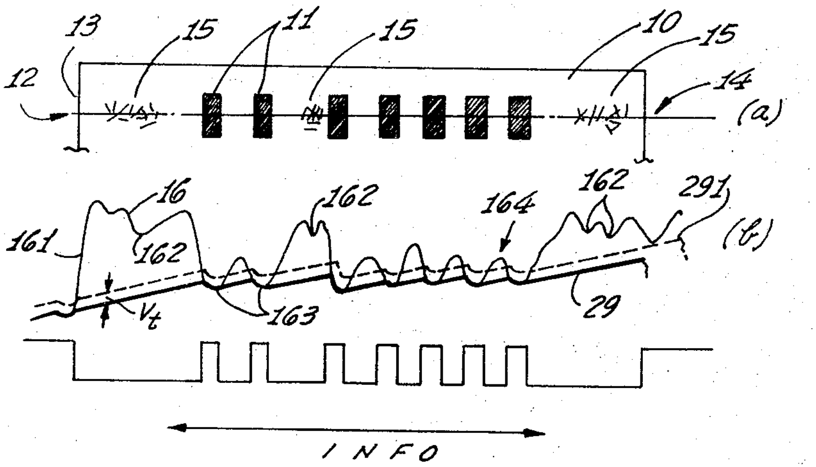
FIG. 1 illustrates in three sections *a*, *b* and *c*, a representative example of a data field in time-space comparison with a signal pattern resulting from practicing the invention by establishing a floating "black" level.

Proceeding now to the detailed description of the drawings, I first turn to FIG. 1 and here particularly to the upper portion identified as 1*a*. This figure illustrates a somewhat simplified version of a data field which is to be read through a scanning process. The data field may be comprised of a label 10 carrying contrasting, i.e., black markings such as 11. The configuration of the markings are simplified here, but I refer specifically to my copending application Ser. No. 284,733 filed June 29, 1972 showing data fields with more detailed markings.

For purposes of describing the present invention, it is presumed that the data field 10 may be a label which is more or less white or rather bright and is affixed to a surface of possibly significantly darker contrast so that the environment 12 is, for example, relatively dark; label 10 may be even fluorescent. As a consequence, there is a rather strongly contrasting edge such as 13.

It must be expected, however, that the data field and label does not provide for a completely bright background but has dirt patches, such as identified with reference numeral 15 which inherently provide some contrast modulation for the signal to be picked up.

The scanning process envisioned here is to be understood in a rather broad sense. For example, a light spot may be moved mechanically, or by way of a flying spot scanner, across the scanning field and thereby transverses a larger area than the data field. Also, the data field may be observed through a vidicon type pickup so that the scanning spot is to be understood as the electron beam scanning the image on a vidicon target.

The data field may be scanned across by means of a scanning line such as 14, and a video signal is being produced. This video signal is represented by the trace 16 in FIG. 1*b* shown in space-time alignment with the schematic representation of the data field 10 in FIG. 1*a*. As the scanning spot passes along line 14, the contrast along its way modulates the intensity of the video signal. As soon as the scanning spot passes across edge 13, a jump in contrast occurs as shown at a point or portion 161 of the trace. The dirt patches produce brightness modulation as indicated at 162 in the trace. The minima 163 represent true data, i.e., they represent passage of the scanning spot over the contrasting markings 11 at a relative position so that a certain minimum of reflection is produced. The minima 163 are to be recognized as data, but the minima 162 are to be rejected.

It is not incidental in the illustration of the drawing that, for example, the peak-to-valley excursion as identified at 164 in the trace is not larger, but actually smaller, than the peak-to-valley excursion near the first unwanted signal drop 162. In other words, the resulting modulation on a dynamic basis and resulting from dirt patches may produce relative signal occursions which are quite comparable to the excursions resulting from true data. This is particularly true when the label is fluorescent, where scratches and abrasions removed locally fluorescence. It is, therefore important to provide a distinction between excursions resulting from data and those resulting from soiled labels and portions thereof. Moreover, the frequency response of the pickup system will produce larger signal excursions for wider than for narrower spacings. Also, in the beginning and at the end of a run across the data field, excursions are larger than in between. These problems make it desirable to establish a floating black or white level. A floating black level will be described first, a floating white level will be described later.

Figure 2:
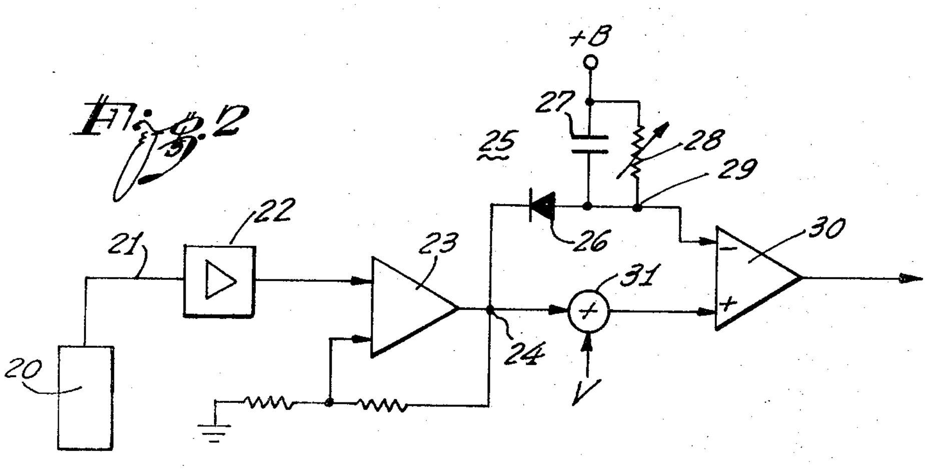
FIG. 2 illustrates somewhat schematically a circuit diagram of an example of the preferred embodiment of the present invention.

After describing more or less the objective, I turn to the description of FIG. 2 which shows a circuit that processes the information so as to extract a train of pulses from the video signal trace 16 which pulses represent true data. The circuit can be regarded as a digitizing or quantizing circuit for the analog-type information as it is represented by the video signal. In FIG. 2, reference numeral 20 denotes generally a video signal pick up. Element 20 may be a photocell, a photodetector, a photomultiplier or the like, in case the scanning process is carried out through a movable illumination spot such as provided by a focussed light spot moved mechanically or by a flying spot scanner. Alternatively, the unit 20 can be understood to be a vidicon tube. In any event, the output line 21 provides a video signal of the type shown in FIG. 1 as trace 16, particularly when the scanning spot moves across this particular data field 10.

Reference numeral 22 refers to a pre-amplifier which is connected to line 21 and presents the video signal in a more suitable level. A differential amplifier 23 provides some bias to obtain some noise and background rejection as far as the video signal is concerned. The terminal 24 therefore can be considered as the one which provides the signal shown as trace 16 in FIG. 1*b*. The output signal of the amplifier 23 has been selected so that it remains always, i.e., even at maximum brightness, well below a particular bias voltage B+. By way of example, B+ may be 15 volts but this is, of course, arbitrarily selected.

The video signal is now processed first in a circuit 25 to establish a reference and to extract from this information signal trace the reference signal configuration to be used for digitizing and information extraction. This circuit 25 can also be described as a unidirectional sample-and-drift circuit. Circuit 25 includes a diode 26 connected as illustrated to terminal 24 and having its anode connected to B+ via a parallel circuit comprised of a capacitor 27 and *a*, preferably, adjustable or trimable resistor 28.

Assuming for a moment that the resistor 28 were not there, then the anode, i.e., the circuit terminal 29 will always remain at the lowest potential provided by the amplifier 23 (subject only to leakage). Therefore, the terminal 29 will recognize signal minima, and its potential will be relatively low as compared with preceding and succeeding signal traces. However, capacitor 27 is shunted by resistor 28 which causes a discharge of the capacitor 27. Thus, the potential of terminal 29 tends to rise towards B+. The rise will be about linear if B+ is sufficiently higher than "white" video signals.

As a consequence of the operation of circuit 25, the signal trace 16, for example, when applied to terminal 24 is processed by circuit 25 to produce a signal at terminal 29 in accordance with the solid trace in FIG. 1b identified therein also by reference numeral 29. The shape of the signal 29, as resulting from this controlled drift, will be selected so that the signal level is with certainty above the signal level of the next following minimum. Selection of the shape results from balancing two opposing constraints. On one hand, the floating level signal should remain as tangent as possible to all minima, and follow the minima as closely as possible. In other words, the floating level signal should not be too far below any rather shallow minimum that may be of information significance. Thus, the floating references should follow closely dynamic variations, which is particularly important for high scanning speeds, when the frequency response may induce wide dynamic variations. On the other hand, the floating level should not deviate too much from a straight line for signal minima that follow each other at the same level.

As the scanning beam approaches a contrast edge 13 and passes thereacross, the signal level rises rapidly as was explained above by referring to trace portion 161. But the bias signal at terminal 29 rises only slowly. The drift is now selected, i.e., the RC values of the circuits 27, 28, are selected so that when the scanning spot reaches the first information bar 11 and the signal level drops, it will drop somewhat below the signal level prevailing in terminal 29 at that point.

One can see here one purpose of the controlled drift. The signal level could, but cannot be expected to drop again below the level it had before the scanning spot hit edge 13, so that the signal excursion down will not reach the previous level. It was for this reason, that the floating black reference level should rise. On the other hand, it can readily be seen that the dirt patches which produce a first excursion 162 are not sufficiently strong to provide a signal level drop that reaches the potential at terminal 29. The same is true for each of the other unwanted drops in signal level.

Therefore, it can be seen that a useful reference signal is extracted from the video signal which is modified by the desired drops in signal level, but the reference signal adjusts itself dynamically to conditions making it possible to provide suitable rejection of contrast modulation resulting from dirt patches on the label. The trains 29 and 16 show also how the dynamic range deteriorates as scanning progresses. The peak-to-valley excursions become shallower and the black level seems to drift up. The floating black reference 29 follows that change readily and thus provides a new reference for each signal upswing.

The signal at terminal 29 is now applied to one input of a differential amplifier 30; the other terminal receives the video signal via a summing circuit 31 coupling the terminal 24 to that other terminal of a differential amplifier 30. The summing circuit 31 subtracts from the video signal a preselected threshold voltage V. The resulting shift in signal level when translated as to its effect on the comparison circuit 30 amounts to a shift of the reference curve 29 to the dash curve 291 in FIG. 1*b*. It should be mentioned, that the voltage V as applied to the scanning is not directly determinative of the trigger level. The voltage V is composed of the desired trigger level voltage minus the threshold of diode 26. This relative shift of the signals places the operative trigger level along the flanks of signal minima.

Circuit 30 determines when trace 16 is above or below the relative reference level 291 and its output switches accordingly. As a rule of thumb, one can say that the controlled drift of circuit 25 should cause the voltage at terminal 29 to rise so that when combined with the trigger voltage $V_t$, the voltage (291) reaches the flank of the next peak-to-valley drop representing the next data marking, in about the middle thereof. As a consequence, regularly spaced markers and spaces will produce equally wide pulses and pauses. The output of differential amplifier 30 is depicted in FIG. 1*c*. One can see that each minimum is now represented by a pulse, and the train of pulses faithfully depicts and represents the pattern of contrast bars in the data field.

The embodiment above was described in relation to the generation of a floating "black" level (trace 29). A floating white level could be established by turning the diode 26 around and by changing the polarity of V in FIG. 2. A floating white level was found suitable for some specific reasons. In my copending application Ser. No. 284,733 filed June 29, 1972, I disclose data field scanning as being limited to a data field area. Also, the label and data field background is not necessarily fluorescent, as other criteria are disclosed to search for and find the data field. Dirt markers on regular printed labels do not have such pronounced effect on the contrast.

Upon limiting the scanning raster field to approximately the data field, though beneficial from standpoint of read time, one must consider the fact that the scanning spot is blanked during retrace, and the video signal thus drops to the absolute black level. It would be impractical to let the "sample-and-drift" circuit run from that black level; data markings may occur too early. It will be recalled, that updating of the black reference level depends on the fact that the sample-and-drift circuit reaches a signal level somewhat above the next minimum (163) to be recognized. Thus, it was found better under these circumstances to operate with a floating white level.

Figure 3:
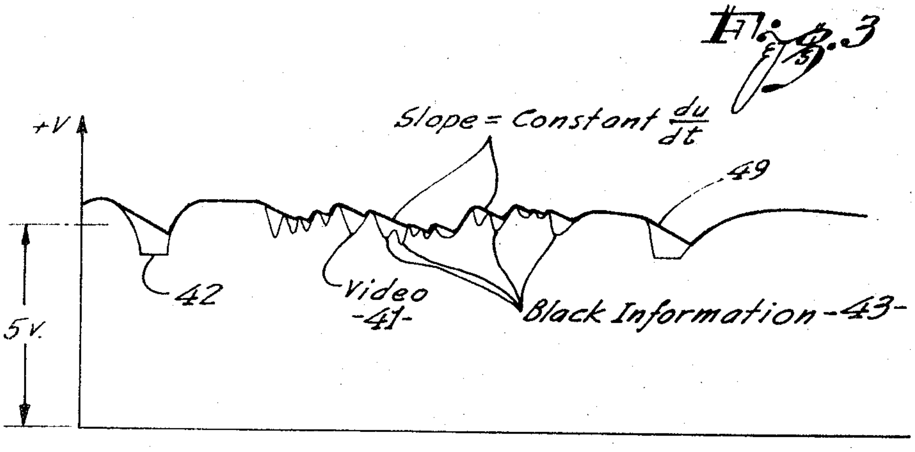
FIG. 3 shows a diagram for a video signal with superimposed floating "white" level.

FIG. 3 illustrates representatively a video signal trace 41 as it may result as output of a vidicon tube when scanning a data field. Trace portion 42 denotes the drop in signal level during flyback or retrace of the vidicon scanning beam and when the beam is blanked. Excursions 43 represent the signals resulting from passage of the scanning beam across vidicon images of contrasting markers. Trace 49 denotes the reference level as established by circuit 45 in terminal 49 of FIG. 4.

Figure 4:
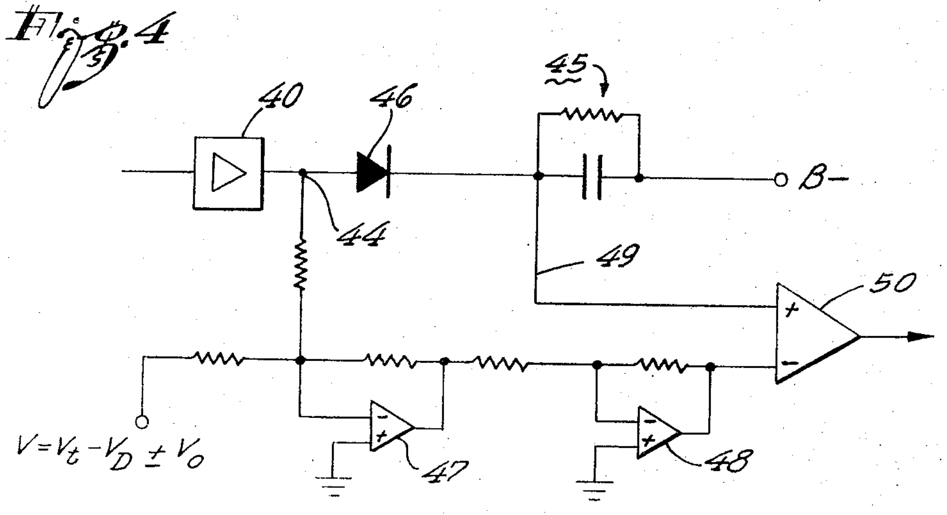
FIG. 4 illustrates somewhat schematically a circuit realizing the floating white level as per FIG. 3.

Turning now to FIG. 4, circuit 45 therein is similar in principle to circuit 25 in FIG. 2 except for the turned around diode 46 and using B− as bias. Line or terminal 49 in FIG. 4 thus develops a signal such as 49 in FIG. 3 if a video signal such as 41 is applied to input terminal 44 of the circuit. Block 40 denotes generally the vidicon with immediate output circuit (pre-amplifier) which develops a useful video signal upon scanning across a data field.

The signal is applied to terminal 44 so that the circuit 45 generates the reference signal 49 to be applied to one input of a comparator 50. The trigger threshold signal $V_t$ from the comparator is introduced via a summing point amplifier 47, which receives also the video signal on terminal 44. The signal $V_t$ appears as a component in a composite signal V, having additionally the diode threshold VD as component, to eliminate this threshold from the comparator input. Amplifier 47 is an operational amplifier which provides an inverted signal; for this reason, another operational amplifier 48 provides another inversion of the video signal with superimposed signal V. The latter signal includes as third component $V_o$, the offset voltages for the two amplifiers 47 and 48. The utilization of operational amplifiers for introducing the threshold voltage $V_t$ is beneficial in that the d.c. bias drift of the video signal itself is simultaneously applied to the two inputs of the comparator 50 and does not effect the production of the pulse train.

The following possible case should be noted. If the scanning spot happens to run across a rather long and very dark area, the potential at point 49 will continue to drop and the floating white level may even approach the signal level as representing scanning the very dark area. In combination with the signal $V_t$, the trigger level for the comparator 50 may be traversed by the vidicon output even though there is no or only insignificant contrast. However, this aspect is of no importance, as a drop of the white reference to black signal levels may occur only under circumstances clearly outside of a data field. Whenever the scanning beam passes across the boarder to a data field, the video signal will go up, not necessarily to a true "white" level, but sufficiently high to drive the floating reference up again so that a contrasting marking producing a signal drop thereafter provides sufficiently large signal differential relative to the just restored white reference level.

Figures 5, 5A:
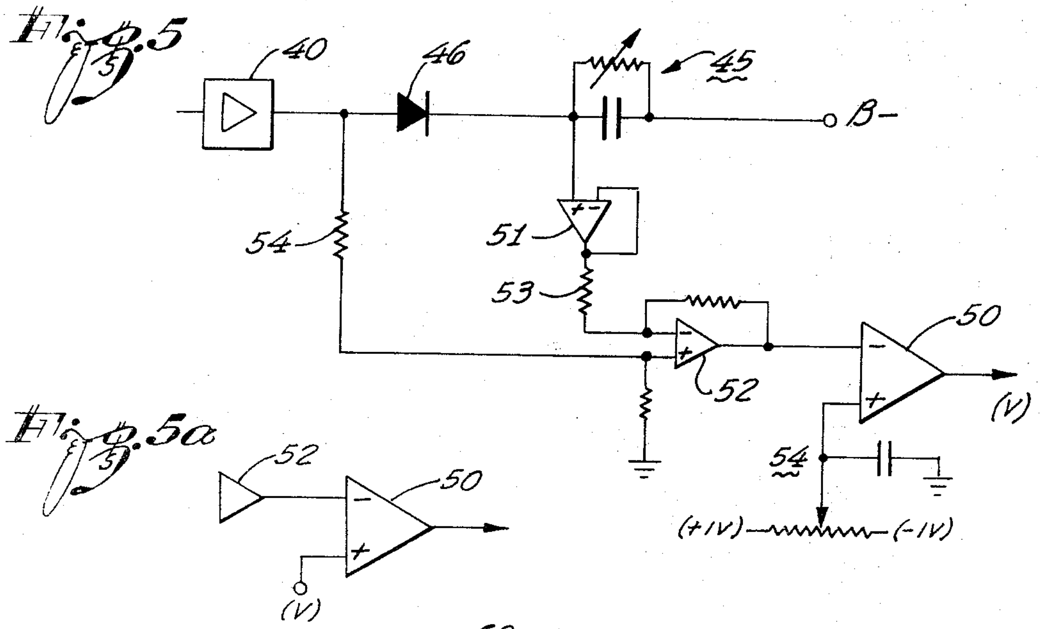
FIG. 5 and 5*a* show a circuit diagram with improvements over the circuit of FIG. 4.

The example in accordance with FIG. 4 is characterized by the fact that the threshold voltage $V_t$ is added onto the (positive) video signal. Such a signal summation requires a relatively large signal range to be accommodated at the comparator input. Also, utilization of a fixed trigger level $V_t$ may constitute an unnecessary constraint in cases where the dynamic variations (difference in sequential peak-to-valley excursions) are significant while imperfections of the label are less apparent. The circuit of FIG. 5 differs from the circuit shown in FIG. 4 on both accounts, but it will become apparent that the cases can be taken up separately when the need requires it.

The video signal is developed in circuit 40 and the sample-and-drift voltage for the floating white level is developed in circuit 45 as before. Video signal and floating reference signal are subtracted from each other in subtracting amplifier 52, whereby an amplifier 51 serves as unity gain buffer with high input and low output impedances. If the several resistances on amplifier 52, including resistors 53 and 54 are similar, the output amplifier will be a signal that drops to zero for each updating of the floating level reference by video signal excursions.

The floating white reference signal is now applied to one input of the comparator 50. If the other input of the comparator 50 receives a fixed voltage V (see FIG. 5*a*), the circuit would again work with a fixed trigger level which is introduced in the other input of the comparator. Such circuit constitutes only one modification from FIG. 4; namely, reducing the input range for the comparator were present. The circuit 55 in FIG. 5, however, could provide a different voltage, having nothing to do with the trigger level. This provision is relevant for the second particular aspect of this circuit.

Assuming that, for example, resistor 53 has a value different (positive) from the value of the other resistors (including 54) in the circuit of amplifier 52; the gain of the floating reference signal as effective in subtracting amplifier 51 will be different. If the resistance of resistor 53 is higher than that of the other resistors, the gain may be reduced, and the floating white level is lower in toto as compared with the video signal itself and as effective in subtracting amplifier 52.

Figure 6A:
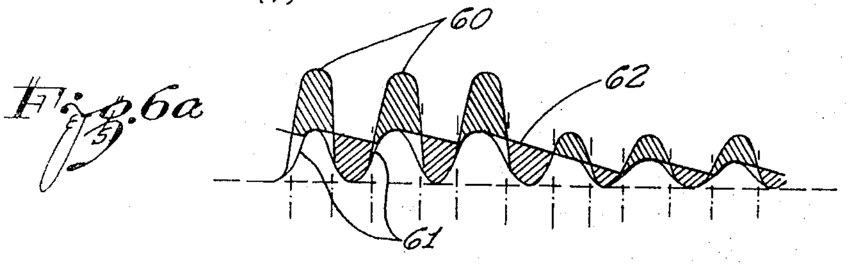
FIGS. 6*a* and 6*b* show signal diagrams relevant to FIG. 5.

FIG. 6a illustrates the video signal component 60 of and in subtracting amplifier 52. Reference numeral 61 illustrates the (hypothetical) reduced gain, video signal as seemingly used for obtaining the floating white reference signal 62. That reference signal 62 is effective in amplifier 52, but due to the gain change, this floating white reference actually floats below the video white signal, and thus combines the function of the trigger level signal $V_t$ in the other embodiments. That trigger level is not fixed, but a fixed fraction of the peak-to-valley excursions in each instant.

Figure 6B:
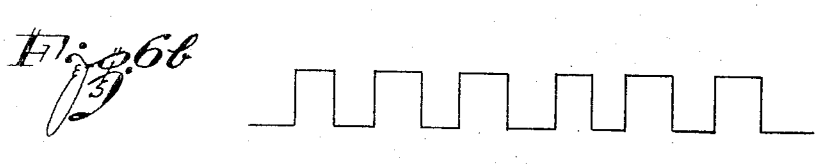

The different hatchings in FIG. 6a show portions of trace 60 above and below floating white reference 62. FIG. 6b illustrates the resulting pulse train as produced by the comparator 50 when the output of subtracting amplifier is applied to the one comparator input. The other comparator input receives an error correction and trimming signal only, and providing such signal is the purpose of circuit 55. The correction voltages include the offset voltages of all amplifiers (50, 51, 52) as well as diode threshold voltage.

Instead of, or in addition to, decreasing the gain for the floating white reference signal, one could readily increase the gain for the video signal proper by decreasing the value of resistor 54 relative to resisto53 and the other.

The invention is not limited to the embodiments described above but all changes and modifications thereof not constituting departures from the spirit and scope of the invention are intended to be included.

I claim:

1. Apparatus for quantizing video information represented by video signals as resulting from scanning a particular area which contains contrasting markings comprising:

first means connected for receiving the video signals and being responsive to the level of signal extremities having one particular direction, to sample the value thereof but gradually changing the sampled value at a controlled rate in direction opposite to the direction of the extremities independantly from the extremities directed in direction opposite to the particular direction; and second means for receiving the video signal and the sampled and changed signal as provided by the first means and including third means for deriving a trigger signal from the sampled and changed signal, the second means including means responsive to said trigger signal as derived by the third means and further reponsive to said video signal as received for triggering production of the leading edge of a pulse when the trigger signal traverses the video signal as varying towards the respective next one of said extremities, while producing subsequently the trailing edge of that pulse when the trigger signal as updated by the sampled value by operation of the first means traverses the video signal as changing from said extremity, so as to obtain a train of pulses.

2. Apparatus as in claim 1, the third means provided for combining the video signal with a signal determining the trigger level to produce a combined signal, the second means including a comparator which receives the sampled and changed signal and the combined signal to provide the pulse train.

3. Apparatus as in claim 1, the third means providing different effective gain for the sampled and changed signal and the video signal.

4. Apparatus as in claim 1, the first means and the third means adjusted to obtain a trigger level of about half between a peak-to-valley excursion where the video signal represents a scan across a field of contrasting markers, spaced apart by about equally wide spaces.

5. Apparatus as in claim 1, the first means comprised of a diode and an RC circuit with bias, the diode connected with one terminal to receive the video signal, the other terminal connected to the bias via the RC circuit, the changed sampled signal being derived from said other terminal, the bias being high above the level of the video signals, to obtain a substantially linear change.

6. Apparatus for quantizing video information represented by video signals as resulting from scanning a particular area which contains contrasting markings comprising:

first means connected for receiving the video signals and being responsive to the level of particularly directed signal extremities to sample the value thereof but gradually changing the sampled value at a controlled rate in direction opposite to the direction of the extremities, the first means presenting an output representing the sampled and changed value at a particular gain;

second means for providing the video signals with second particular gain, higher than the first particular gain with respect to the video signal as received by the first means; and third means, connected to the first and second means for comparing the output signals of the first means with the video signals as provided by the second means and providing a train of pulses, as a result of the comparison.

7. Apparatus as in claim 6, wherein the third means includes a differential amplifier, the video signal being provided to the first means along a first path, the second means continuing the first path and providing the sampled-and-changed value to one input of the differential amplifier, the video signal being provided to a second input of the differential amplifier via a second path constituted by the second means, one of the first and second paths including means for changing the signal gain in the respective path.

8. Apparatus as in claim 7, wherein the third means includes a second differential amplifier having one input connected to the output of the first mentioned differential amplifier and having a second input connected to a source of reference signals.

9. Apparatus for quantizing video information represented by video signals as resulting from scanning a particular area which contains contrasting markings, comprising:

first means connected for receiving the video signals and deriving therefrom a reference signal composed of increments conforming a portion of the video signal contor adjacent a signal extremity of one particular direction and only where changing towards such an extremity;

second means connected for continuing said reference signal at a controlled and constant rate in direction opposite to the direction of the extremity after the video signal level changes from said extremity at a faster rate to produce a coherent and continuous reference signal, the reference signal as continued at the controlled rate continuing independantly from extremities in the opposite direction until inter-secting the video signal contour as changing towards another extremity of the one direction, the reference signal then being continued by a segment as provided by the first means, third means cooperating with said first and second means to establish a trigger level which is off set from said reference signal in the said opposite direction in relation to the video signal; and fourth means connected to the third means and further connected to receive the video signal to produce a train of pulses by comparing the trigger level with the video signal as received, whereby a pulse flank is produced always ahead of said intersecting, a pulse flank in the opposite direction being produced beyond the extremity following the said intersecting.

* * * * *